(12) United States Patent
Radulescu

(10) Patent No.: US 9,981,505 B2
(45) Date of Patent: May 29, 2018

(54) TIRE WITH LAMELLE IN BRIDGE

(75) Inventor: Robert C. Radulescu, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1522 days.

(21) Appl. No.: 12/997,726

(22) PCT Filed: Jun. 23, 2008

(86) PCT No.: PCT/US2008/067858
§ 371 (c)(1),
(2), (4) Date: Dec. 13, 2010

(87) PCT Pub. No.: WO2010/008370
PCT Pub. Date: Jan. 21, 2010

(65) Prior Publication Data
US 2011/0094641 A1  Apr. 28, 2011

(51) Int. Cl.
*B60C 11/12* (2006.01)
*B60C 11/03* (2006.01)
*B60C 11/00* (2006.01)

(52) U.S. Cl.
CPC .......... *B60C 11/0306* (2013.01); *B60C 11/12* (2013.01); *B60C 11/125* (2013.01); *B60C 11/1218* (2013.01); *B60C 2011/0033* (2013.01); *B60C 2011/129* (2013.01); *B60C 2011/1213* (2013.01)

(58) Field of Classification Search
CPC ............... B60C 11/125; B60C 11/0306; B60C 11/12–11/1281; B60C 2011/12–2011/1295

USPC ............ 152/DIG. 3, 209.22, 209.25, 209.18
See application file for complete search history.

(56) References Cited

U.S. PATENT DOCUMENTS

| | | | |
|---|---|---|---|
| 5,350,001 A | 9/1994 | Beckmann et al. | |
| 6,102,092 A | 8/2000 | Radulescu | |
| 7,237,588 B2 | 7/2007 | Suzuki | |
| 2002/0043318 A1* | 4/2002 | Kuze | 152/209.16 |
| 2009/0090445 A1* | 4/2009 | Itou | 152/209.25 |

FOREIGN PATENT DOCUMENTS

| | | | | |
|---|---|---|---|---|
| EP | 0 841 199 A2 | 5/1998 | | |
| JP | 62-018305 | 1/1987 | | |
| JP | 03109107 A | * 5/1991 | ............ | B60C 11/03 |
| JP | 08-067112 | 3/1996 | | |

(Continued)

OTHER PUBLICATIONS

Supplementary European Search Report for EP 08 78 0921, dated Jul. 2, 2011.

(Continued)

*Primary Examiner* — Steven D Maki
*Assistant Examiner* — Philip N Schwartz
(74) *Attorney, Agent, or Firm* — Dority & Manning, P.A.

(57) ABSTRACT

A tire is provided having features in the tread elements that provide improved resistance to wear and, more particularly, irregular wear. More specifically, lamellae are provided along tread elements of the tire and between such tread elements to provide for improved wear patterns and particularly to provide resistance to irregular wear at the leading and trailing edges of the tread element.

15 Claims, 2 Drawing Sheets

(56) References Cited

FOREIGN PATENT DOCUMENTS

| JP | 08-282213 | | 10/1996 | | |
|---|---|---|---|---|---|
| JP | 2000168317 A | * | 6/2000 | ............. | B60C 11/12 |
| JP | 2005-014859 | | 1/2005 | | |
| WO | WO 2007/072717 | | 6/2007 | | |
| WO | WO 2007072717 | * | 6/2007 | ............. | B60C 11/04 |

OTHER PUBLICATIONS

PCT International Search Report for PCT/US2008/067858, dated Oct. 6, 2008.

* cited by examiner

TIRE WITH LAMELLE IN BRIDGE

TECHNICAL FIELD OF THE INVENTION

The present invention relates to a tire having tread features that provide improved resistance to wear and, more particularly, irregular wear. More specifically, lamellae are provided along tread elements of the tire and along a groove between such tread elements to provide for improved wear patterns and particularly to provide resistance to irregular wear at the leading and trailing edges of the tread element.

BACKGROUND OF THE INVENTION

Tires, particularly commercial vehicle tires as used on trucks, must be periodically removed from service and replaced as the tires eventually wear from use. Depending upon the application and maintenance of each tire, anomalies in the tread region can also develop during use that lead to the tire being removed from service before reaching the normal useful life of the tread. Typically, such anomalies are discovered as the driver senses a change in the ride of the vehicle or a change in the tire noise during vehicle use, and removal of a tire having anomalies is frequently a subjective determination. Such anomalies can include, for example, depressions or uneven wear in the tread region, which is generally caused by unequal stress distribution laterally across the tread region. "Heel and toe" wear is a form of irregular wear that can occur in which one side of a tread element—such as the leading edge of a tread block—wears more quickly than the opposing side. An explanation of various types of irregular tire wear can be found in a guide entitled "Radial Tire Conditions Analysis Guide: A Comprehensive Review of Tread Wear and Conditions", published by The Truck Maintenance Council (TMC).

Many different factors can contribute to irregular tire wear. For example, the operating conditions of the vehicle as well as the type of load carried can both have an impact on tire wear. In addition to the existence of many possible causes, it is common that a combination rather than a single factor will start uneven wear or cause it to increase. Determining a solution where a combination of factors is contributing can be particularly difficult.

Accordingly, a need remains to reduce the irregular wear occurring on tread elements such as e.g., tread blocks. The present invention provides one or more features than can help resist the onset and continuation of irregular wear. The onset of "heel to toe" wear is a particular concern that the present invention can be useful in addressing.

SUMMARY OF EXEMPLARY EMBODIMENTS

Objects and advantages of the invention will be set forth in part in the following summary description, or may be obvious from the description, or may be learned through practice of the invention. A summary of certain exemplary embodiments of the present invention will now be set forth.

In one exemplary embodiment of the invention, a tire having tread features that can improve traction and wear is provided. The tire defines axial, radial, and circumferential directions and includes at least one circumferential groove of radial depth $H_0$, a plurality of axial grooves of radial depth H, and a plurality of tread elements positioned circumferentially about the tire and having a height equal to the radial depth $H_0$. The tread elements are defined by the circumferential grooves and the axial grooves. The axial grooves separate the tread elements. Each tread element has a length L along the circumferential direction. A plurality of lamellae are positioned in each tread element. Each lamella extends through the tread element along the axial direction and has a depth along the radial direction. At least one lamella is positioned in each axial groove, extends axially through the tire, and has a depth along the radial direction.

In another exemplary embodiment, the present invention provides a tread for a tire. The tire defines axial, radial, and circumferential directions. The tread includes at least two tread elements defined by circumferential grooves of radial depth $H_0$ and axial grooves of radial depth H. The tread elements have a length L along the circumferential direction. A bridge connects the tread elements along at least one of the axial grooves. A plurality of lamellae are positioned in each tread element with each lamella extending through the tread element along the axial direction and having a depth along the radial direction. Each lamella within a tread element is separated from adjacent lamella by a distance I. At least one lamella is positioned in the bridge and extends axially through the tire at a depth along the radial direction.

The present invention includes numerous variations providing still other embodiments of the present invention. For example, the ratio I/L may be in the range of about $0.15 \leq I/L \leq 0.35$ or, more particularly, in the range of about $0.2 \leq I/L \leq 0.3$. The ratio $H/H_0$ may be in the range of about $0.8 \geq H/H_0 \geq 0.5$ or, more particularly, in the range of about $0.7 \geq H/H_0 \geq 0.6$. The lamellae positioned in each tread element may be equally spaced over the tread element along the circumferential direction. The spacing between lamellae may be less than or equal to about thirty-five percent of the length L of each tread element. The axial grooves may each have a width W along the circumferential direction that is in the range of about 2 mm to about 20 mm. In some embodiments, the tire has at least two lamella positioned in each axial groove or bridge, extending axially through the tire, and a having a depth along the radial direction.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
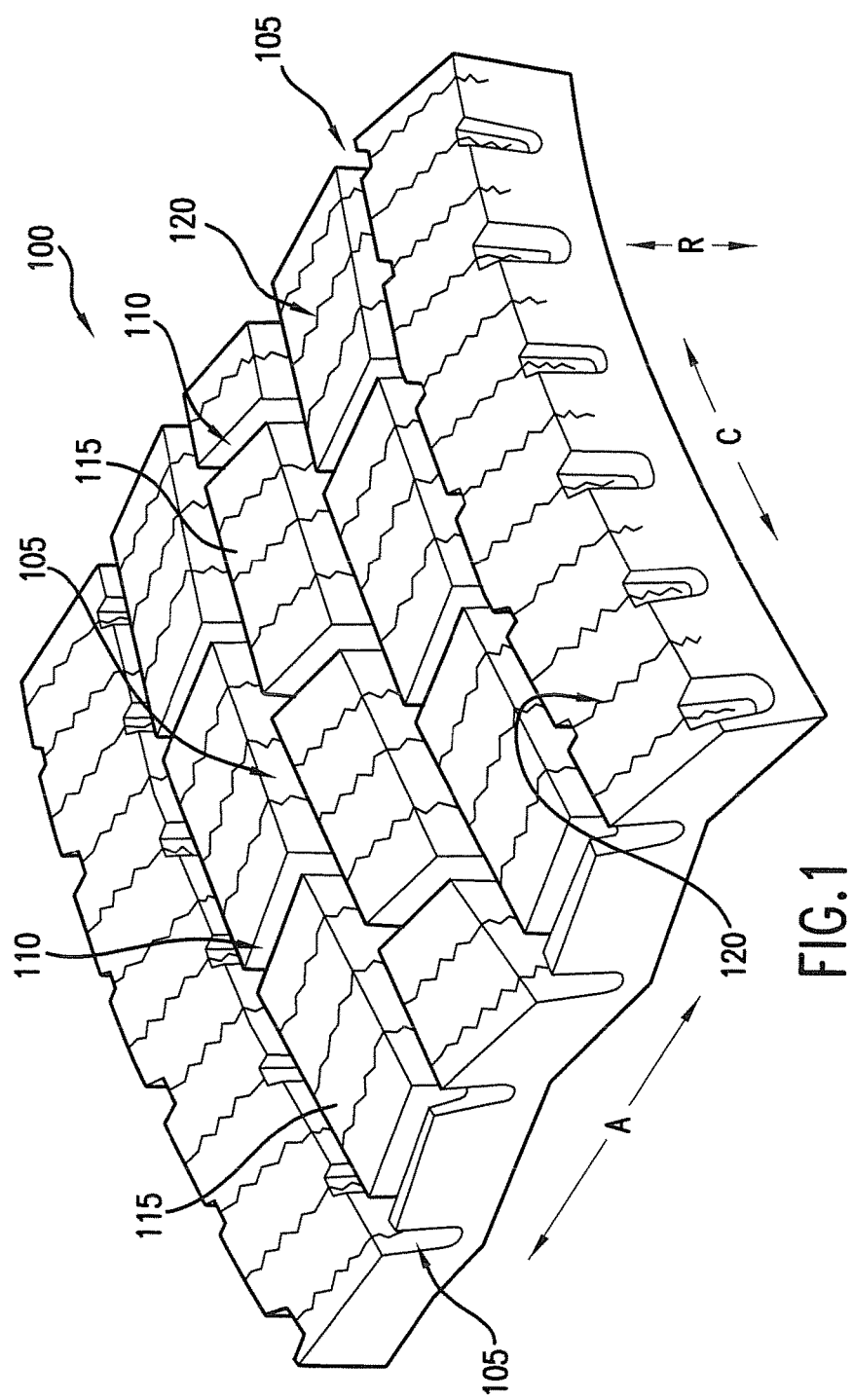
FIG. 1 illustrates a partial perspective view of a tread strip from a tire constructed according to an exemplary embodiment of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
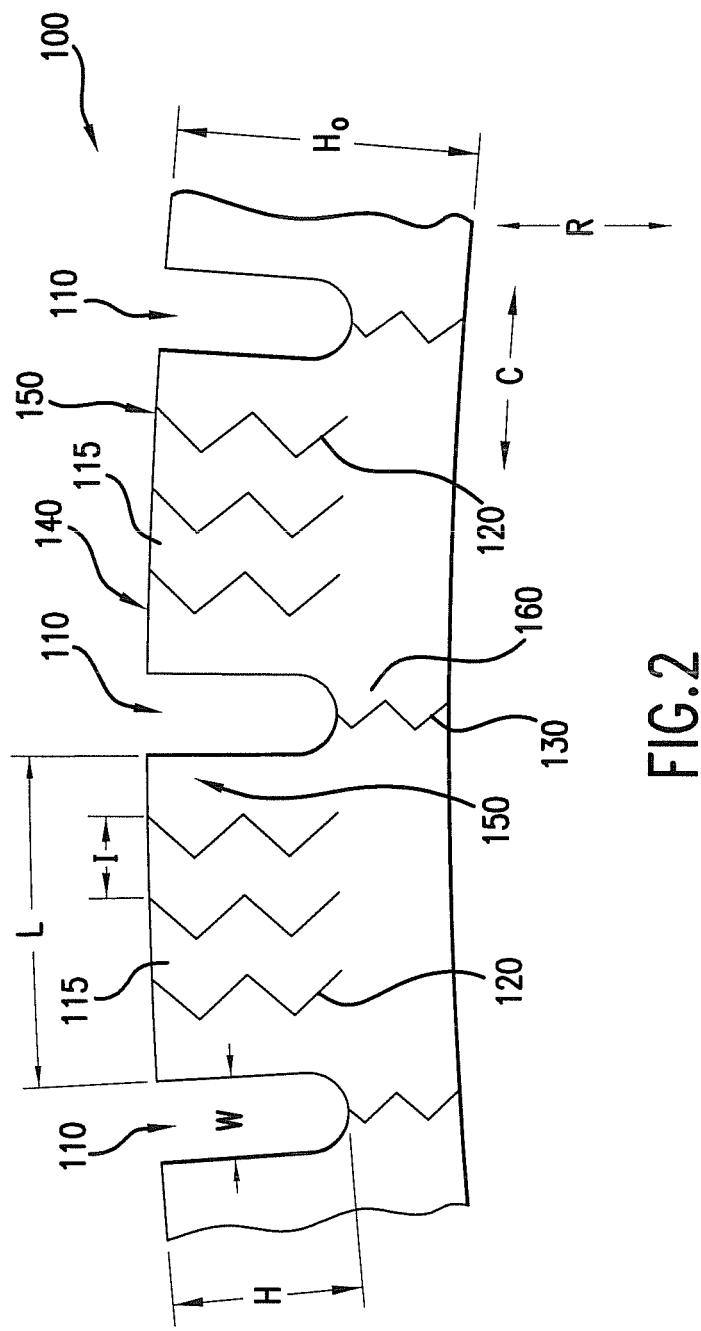
FIG. 2 is schematic representation and partial elevation view of a tread strip constructed according to an exemplary embodiment of the present invention.

As used herein with reference to an exemplary embodiment, the following terms have these definitions:

The term "radial" refers to the direction perpendicular to the axis of rotation of the tire and is designated with arrows R in FIG. 2

The term "axial" refers to the direction parallel to the axis of rotation of the tire and is designated with arrows A in FIG. 1.

The term "circumferential" refers to the circular direction defined by a radius of fixed length as it is rotated about the axis of rotation of the tire and is designated with arrows C in FIGS. 1 and 2.

The term "tread strip" refers to that portion of a tire intended for contact with a support surface.

The terms "tread element" refers to structures projecting from the "tread strip" and may include, for example, a plurality of blocks which are arranged about the circumference of the tire and defined by grooves as described further below.

The terms "lamellae" (plural) and "lamella" (singular) refer to narrow incisions or cracks in the tire tread, which are represented in the figures as lines in the tread strip. A lamella may have a zig-zag configuration along both the radial and axial directions of the tire, but other configurations may also be used.

An exemplary embodiment of a tread strip 100 as may be used with a tire according to the present invention is illustrated in FIGS. 1 and 2. Tread strip 100 includes a plurality of tread elements 115 (e.g., tread blocks) arranged circumferentially about the tire. The tread elements 115 are defined in part by circumferential grooves 105 that extend about the circumferential direction C of the tire and by axial grooves 110 that are oriented substantially along the axial direction A of the tire. As shown in FIG. 2, circumferential grooves 105 have a radial depth $H_0$ while axial grooves 110 have a radial depth H and a width W along circumferential direction C. The particular ornamentation for the tread pattern shown in FIGS. 1 and 2 is provided by way of example only and the present invention may be used with numerous other tread patterns. For example, circumferential grooves 105 and axial grooves 110 may be provided in various other shapes and orientations to define multiple other configurations for tread elements 115 and the overall appearance of the tread pattern.

Tread elements 115 also define multiple lamellae 120. Each lamella 120 is a thin incision that extends completely through the tread element 115 along the axial direction A and has a certain depth into the tread element 115 along the radial direction R. Preferably, each lamella has a zigzag configuration along both axial direction A and radial direction R as illustrated in the figures. Within a tread element 115, each lamella is separated from adjacent lamella by a distance I. While three lamellae 120 are illustrated for each tread element 115, other configurations may be used as well.

A single lamella 120 in tread element 115 can provide improvements not only in tire traction but also in the wear performance of the tire. Furthermore, the addition of multiple lamellae 120 to tread element 115 can further improve the traction and wear performance of the tire. Unfortunately, the addition of multiple lamellae 120 to each tread element 115 can reduce the rigidity of the tread element 115 and lead to chunking or cracking of the same.

It was discovered that bridging between tread elements 115 can reduce or prevent the chunking of tread element 115 that may occur with multiple lamellae. More specifically, each tread element 115 is defined in part by axial grooves 110 that separate the leading and trailing edges 140 and 150 of adjacent tread elements 115. By reducing the depth H of axial groove 110, a bridge 160 can be created that connects adjacent tread elements 115. However, it was also discovered that while such bridging can reduce or eliminate the chunking previously described, the addition of bridge 160 led to other irregular wear problems such as a "heel to toe" wearing effect on the leading and trailing edges 140 and 150 of the tread element 115.

To alleviate this problem, Applicant discovered that the addition of a lamella 130 to bridge 160 can reduce or eliminate the irregular wear induced by the addition of bridge 160. More specifically, lamella 130 is positioned at the bottom of axial groove 110 and in bridge 160. As with lamellae 120 in tread elements 115, lamella 130 preferably has a zig-zag configuration along both axial direction A and radial direction R but other configurations may be used. In addition, while preferably only one lamella 130 is positioned in axial groove up to two lamellae 130 may be used.

In order to increase the benefits of the invention, certain physical parameters should be maintained for tread strip 100. The width W of axial groove 110 should be in the range of about 2 mm to about 20 mm. The ratio $H/H_0$, which is the ratio of the radial depth H of axial groove 110 to the radial depth $H_0$ of circumferential groove 105, should be in the range of about $0.8 \geq H/H_0 \geq 0.5$. More particularly, the ratio $H/H_0$ is in the range of about $0.7 \geq H/H_0 \geq 0.6$. Similarly, the ratio I/L, which is the ratio of the distance L between adjacent lamella 115 to the length L of tread elements 115 along the circumferential direction, should be in the range of about $0.15 \leq I/L \leq 0.35$. More particularly, the ratio I/L is in the range of about $0.2 \leq I/L \leq 0.3$.

Controlled testing confirms the benefits of the invention. The wear and traction of three tires were compared: i) a Witness; ii) Design I—a tire with a single lamella in the center of the tread elements, and iii) Design II—a tire with a plurality of lamella in the tread elements and a single lamella in the axial groove separating the tread elements. As compared to the Witness, Design I provides about a 5 percent improvement in the mileage life of the tire and a 10 percent improvement in traction. Design II provides a 15 percent improvement in the mileage life and a 30 percent improvement in traction as compared to the witness.

It should be understood that the present invention includes various other modifications that can be made to the exemplary embodiments described herein that come within the scope of the appended claims and their equivalents. These and other embodiments of the present invention are with the spirit and scope of the claims that now follow.

What is claimed is:

1. A tire defining axial, radial, and circumferential directions, comprising:
   at least one circumferential groove of radial depth Ho;
   a plurality of axial grooves of radial depth H, wherein the ratio H/Ho is in the range of about $0.8 \geq H/Ho \geq 0.5$;
   a plurality of tread elements positioned circumferentially about the tire and having a height equal to the radial depth Ho, said tread elements being defined by said circumferential grooves and said axial grooves with said axial grooves separating said tread elements, each said tread element having a length L along the circumferential direction;
   a plurality of lamellae positioned in each said tread element, each said lamella extending through said tread element along the axial direction and having a depth along the radial direction, wherein said lamellae positioned in each said tread element are spaced apart from one another by a distance I, and wherein the ratio I/L is in the range of about $0.15 \leq I/L \leq 0.35$; and
   at least one lamella positioned in each said axial groove, extending axially through the tire, and having a depth along the radial direction.

2. A tire as in claim 1, wherein said lamellae positioned in each said tread element are about equally spaced over said tread element along the circumferential direction.

3. A tire as in claim 1, wherein said axial grooves each have a width W along the circumferential direction that is in the range of about 2 mm to about 20 mm.

4. A tire as in claim 1, wherein the tire has at least two lamella positioned in each said axial groove, extending axially through the tire, and a having a depth along the radial direction.

5. A tire as in claim 1, wherein the ratio I/L is in the range of about $0.2 \leq I/L \leq 0.3$.

6. A tire as in claim 1, wherein the ratio H/Ho is in the range of about $0.7 \geq H/Ho \geq 0.6$.

7. A tire as in claim 1, wherein said lamellae positioned in each said tread element are spaced apart from one another by a distance I, and wherein the ratio I/L is in the range of about $0.2 \leq I/L \leq 0.3$ and the ratio H/Ho is in the range of about $0.7 \geq H/Ho \geq 0.6$.

8. A tread for a tire, the tire defining axial, radial, and circumferential directions, the tread comprising:
   at least two tread elements defined by circumferential grooves of radial depth Ho and axial grooves of radial depth H, said tread elements having a length L along the circumferential direction;
   a bridge connecting said tread elements along at least one of said axial grooves,
   a plurality of lamellae positioned in each said tread element, each said lamella extending through said tread element along the axial direction and having a depth along the radial direction, each said lamella within a tread element being separated from adjacent lamella by a distance I, wherein the ratio I/L is in the range of about $0.15 \leq I/L \leq 0.35$; and
   at least one lamella positioned in said bridge and extending axially through the tire and having a depth along the radial direction.

9. A tread for a tire as in claim 8, wherein the ratio I/L is in the range of about $0.2 \leq I/L \leq 0.3$.

10. A tread for a tire as in claim 8, wherein the ratio H/Ho is in the range of about $0.8 \geq H/Ho \geq 0.5$.

11. A tread for a tire as in claim 8, wherein the ratio H/Ho is in the range of about $0.7 \geq H/Ho \geq 0.6$.

12. A tread for a tire as in claim 8, wherein the ratio I/L is in the range of about $0.2 \leq I/L \leq 0.3$ and the ratio H/Ho is in the range of about $0.7 \geq H/Ho \geq 0.6$.

13. A tread for a tire as in claim 8, wherein said axial grooves each have a width W along the circumferential direction that is in the range of about 2 mm to about 20 mm.

14. A tread for a tire as in claim 8, wherein said at least one lamella positioned in said bridge has a zigzag configuration along both the axial and radial directions.

15. A tire as in claim 1, wherein said at least one lamella positioned in said axial groove has a zig-zag configuration along both the axial and radial directions.

* * * * *